Jan. 26, 1960   R. L. HIBBARD ET AL   2,922,544
RUPTURE DISK ASSEMBLY
Filed Sept. 6, 1957
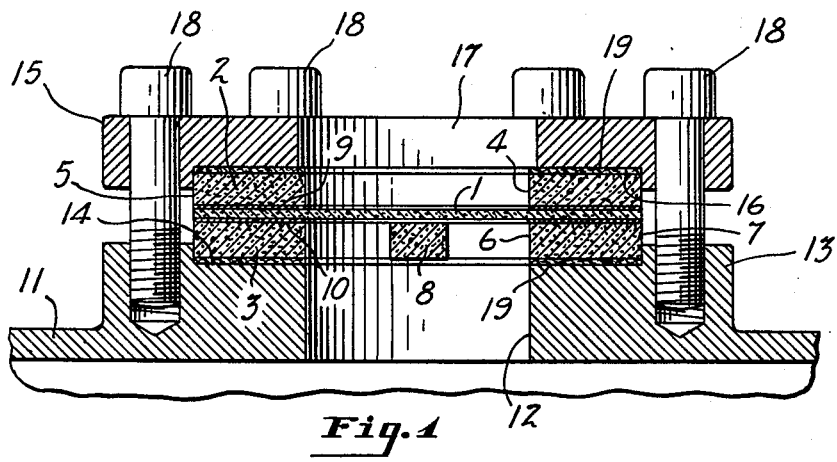
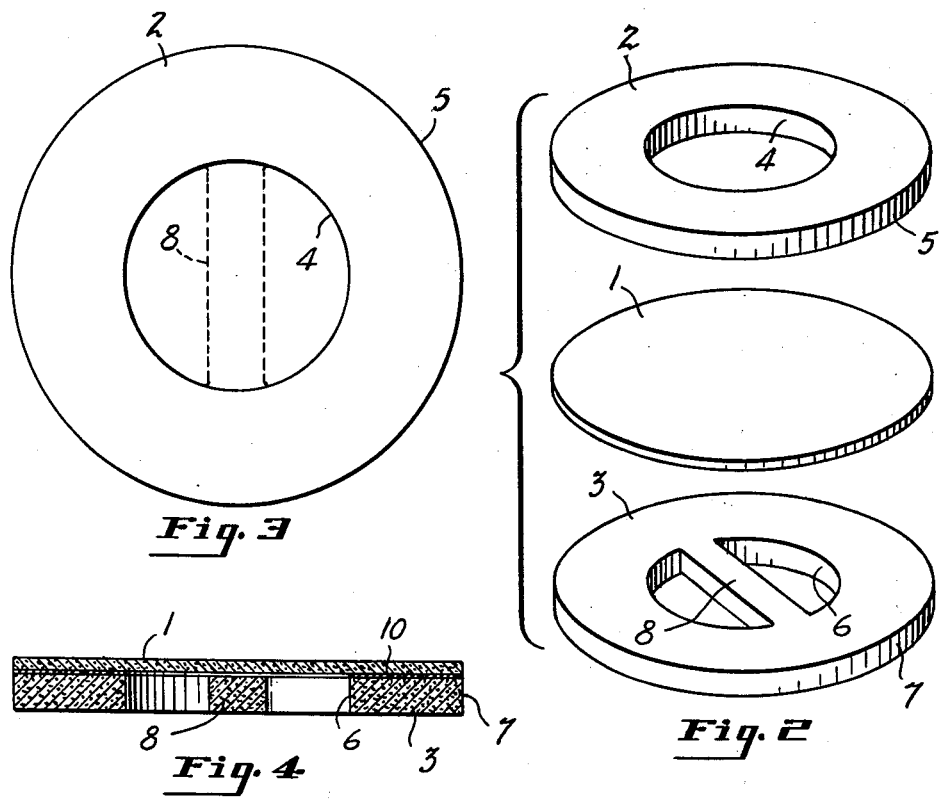
INVENTORS
*Robert L. Hibbard*
*Vance I. Means*
BY *McCoy, Greene & Grotenhuis*
ATTORNEYS

United States Patent Office 2,922,544
Patented Jan. 26, 1960

2,922,544

RUPTURE DISK ASSEMBLY

Robert L. Hibbard, Ridgway, and Vance I. Means, St. Marys, Pa., assignors to Pure Carbon Company, Inc., a corporation of Pennsylvania Application September 6, 1957, Serial No. 682,498

4 Claims. (Cl. 220—89)

This invention relates to a rupture disk assembly for use as a protective device on tanks, receptacles or conduits in which fluid pressure may develop.

Rupture disks are designed to burst under a predetermined pressure and may be used in combination with a pressure relief valve or alone. A rupture disk can be advantageously used in combination with a pressure relief valve in cases where the contents of the tank are valuable or toxic or would have a corrosive effect on the relief valve, the rupture disk being placed between the relief valve and the interior of the tank so that it permits escape through the relief valve only after the disk has burst, the discharge through the relief valve being only that required to reduce the pressure below that at which the relief valve is set.

In some instances a rupture disk and a pressure relief valve are used separately on the same tank, the relief valve being set to operate at a pressure below the burst pressure, the rupture disk serving as a safety device effective when the relief valve fails to function.

Burst disks may be used alone on low pressure tanks containing a liquid having a vapor pressure below atmospheric. In case the tank becomes overheated the rupture disk will blow and evaporation cools off the tank contents before much of the contents is lost.

When rupture disks are used between the interior of the tank and a pressure relief valve or as the sole pressure relieving means, it is highly important that the disk be so formed that it will burst at a pressure very close to desired pressure regardless of temperature, that its sensitivity to pressure be unaffected by repeated deflections at near to bursting point, and that the disk be of a material that is not deteriorated by chemicals being processed.

The present invention provides a rupture disk assembly in which a flat, frangible disk of carbon graphite is employed as the rupturable element. Carbon is uniquely suitable for rupture disks for the reason that it has no creep due to repeated flexures below the bursting flexure and for the reason that it will always fail at the same pressure independent of time, temperatures, or previous loads, short of the rupture point. However, carbon disks are very susceptible to damage in handling incident to the transportation from the factory to place of use.

It is the main purpose of the present invention to provide a carbon rupture disk assembly such that the thin frangible disk which forms the sensitive portion of the assembly is effectively protected against damage in handling or by vibration when in service.

The assembly of the present invention comprises a thin, flat, frangible disk of carbon graphite of known deflection characteristics and at least one reinforcing ring of carbon graphite thicker than the disk and having a flat annular face permanently secured to the marginal portion of the disk face by means of a cement. The thick marginal rings serve to protect the frangible disks when packed for shipment. Two stiffening rings are preferably employed, one on each face of the frangible disk and one of the rings may be provided with an integral portion forming a cross bar extending diametrically across the center of the ring. This cross bar, which is of substantially the same thickness as the rest of the ring, is positioned on the inside of the frangible disk when the assembly is mounted on the tank and its upper face is spaced slightly from the under face of the disk so that the cross bar does not reduce the surface area of the disk acted upon by the fluid pressure. If the thickness of the cement layer between the disk and ring is not sufficient, the top face of the cross bar may be slightly relieved to provide a few thousandths of an inch clearance between the bar and the disk. The cross bar serves when used on a tank in which pressures below atmospheric may occur, to prevent rupture of the disk by atmospheric pressure. The cross bar also provides additional protection for the disk during transportation from the factory to the place of use.

Reference should be had to the accompanying drawings forming a part of this specification in which:

Figure 1 is a sectional view showing the rupture disk assembly of the present invention mounted over a tank outlet opening;

Fig. 2 is an exploded view showing the frangible carbon disk and carbon reinforcing rings in perspective;

Fig. 3 is a top plan view of the assembly; and

Fig. 4 is a sectional view showing the disk assembly in which a single supporting ring is attached to the frangible disk.

As shown in the accompanying drawings, the rupture disk assembly comprises a thin frangible carbon graphite 1 and upper and lower supporting and protecting rings 2 and 3 also of molded carbon, which are of the same diameter as the disk but thicker than the disk, which have flat top and bottom faces, and which are permanently secured to the disk. The upper ring 2 has concentric cylindrical interior and exterior faces 4 and 5 and the lower ring 3 has concentric interior and exterior cylindrical faces 6 and 7 that are of the same diameter as the faces 4 and 5 of the upper ring. The lower ring also has an integral cross bar 8 that is of substantially the same thickness as the rest of the ring and that connects diametrically opposite portions of the ring. The top ring 2 is permanently attached to the disk 1 by a layer 9 of cement interposed between the flat annular bottom face of the ring 2 and the marginal portion of the top face of the disk 1. The bottom ring 3 is permanently attached to the disk by a similar annular layer of cement 10.

The disk assembly may be mounted in the tank wall as shown in Fig. 1 where the top wall 11 of the tank has an opening 12 surrounded by an outwardly projecting boss 13 that is provided with a recessed ring receiving seat 14. The openings of the rings 2 and 3 register with the opening 12 in the tank and the assembly is held in place by a clamping ring 15 having a recessed ring receiving seat 16 and an opening 17 that is centered with respect to the seat 16. The clamping ring 15 is clamped against the rupture disk assembly by angularly spaced bolts 18 radially outwardly of the disk assembly. Gaskets 19 are interposed between the rings 2 and 3 and the seats 16 and 14 and these gaskets are preferably formed of an elastic yieldable material such as rubber, so that they will compensate for any roughness in the seats 14 and 16.

In some instances the upper ring 3 may be omitted as shown in Fig. 4 of the drawings. In packaging assemblies such as shown in Fig. 4, the disk assemblies will be stacked with a separator sheet of paper or the like between successive assemblies to prevent abrasion of the rupture disks 1 and the disks 1 will be effectively protected by the cross bars 8.

In the manufacture of the carbon disks 1 carbon flour is wetted with pitch by intensive mixing, the mixture is molded and baked and the molded disks are then machined to the required dimensions. The carbon flour may be finely ground graphite, lamp black or coke or any mixture thereof. The baking is at a temperature of at least 1100° F. and may be at temperatures up to 5500° F. when it is desirable to graphitize the material.

The batches from which the carbon disks are made are specially compounded and baked at predetermined temperatures for predetermined times in order to obtain the desired uniformity in structure and the desired deflection characteristics. The supporting rings are produced in a similar manner but need not be made from the same batch as the disks and the specifications need not be as exacting. In order to make the rings and disks of uniform thickness and provide them with smooth surfaces, double disk grinding or lapping is employed.

Since carbon in the baked stage is generally quite porous, it is necessary to treat the disk and rings with an impregnating or coating material to plug the pores of the disk and supporting rings with a substance that is inert to the contents of the pressure vessel and that will withstand the temperatures to which the assembly is subjected in service. For this purpose various natural or synthetic resins may be employed which will plug the pores of the disk without materially affecting the strength of the disk. In most instances the disk is impregnated with a thermoplastic or thermosetting resinous material, but where a disk assembly is subjected to high temperatures the disk may be partially impregnated or coated with a resinous material of high melting point which plugs the pores only adjacent the exposed faces of the disk. Since the deflection of the disk is slight prior to rupture the resinous filler or coating does not materially affect the frangibility of the disk. For temperatures below 200° F. polyethylene is a satisfactory filler, since it will resist most chemicals and when melted will readily permeate the molded carbon. For vessels operating above 200° F. the disk may be impregnated or coated with a higher melting point plastic. Examples of such plastics are Kel-F, a monochlorofluorethylene polymer or Heresite, a phenolformaldehyde plastic.

The support rings 2 and 3 are also treated to render them impervious to gases, by impregnating or coating them with a suitable impregnating or coating material capable of withstanding the temperatures to which the rings may be subjected and not affected by the chemicals being processed.

The cement employed for securing the supporting rings 2 and 3 to the rupture disk 1 may be a synthetic rubber base adhesive or a thermoplastic such as Kel-F. The selection of the adhesive is determined by the temperatures and the chemicals to which the rupture disk assembly is to be subjected in service.

It is to be understood that in accordance with the provisions of the patent statutes, variations and modifications of the specific devices herein shown and described may be made without departing from the spirit of the invention.

What we claim is:

1. A rupture disk assembly comprising a flat frangible molded porous disk of carbon graphite having its pores plugged with a resinous material to make it impervious to gases, and a flat molded porous reinforcing ring of carbon graphite also having its pores plugged with a resinous material to render it impervious to gases that is thicker than said disk and that has a flat annular face portion permanently secured to the marginal portion of a face of said disk.

2. A rupture disk assembly comprising a flat frangible molded porous disk of carbon graphite having its pores plugged with a resinous material to make it impervious to gases, and a flat molded porous ring of carbon graphite also having its pores plugged with a resinous material to make it impervious to gases, that is thicker than said disk, that is of the same diameter as the disk and that has flat top and bottom faces and cylindrical external and internal faces, said ring having a flat annular face portion between said internal and external faces permanently secured to said disk and an integral crossbar of substantially the same thickness as the ring connecting diametrically opposite portions of said ring and spaced therefrom.

3. A rupture disk assembly comprising a flat frangible molded porous disk of carbon graphite impregnated with a resinous material, and two molded porous reinforcing rings of carbon graphite impregnated with a resinous material, each thicker than the disk, each of said rings having external and internal cylindrical faces and flat annular face portions between said faces, said rings being permanently secured to opposite faces of said disk by cement between the marginal portions of the disk faces and flat annular face portions of the rings.

4. A rupture disk assembly comprising a flat frangible one piece disk of baked porous carbon graphite having its pores plugged with an inert heat resistant material to make it impervious to gases, and a flat one piece ring of baked porous carbon graphite that is thicker than said disk and that has a flat annular face portion permanently secured to the marginal portion of a face of said disk, said ring also having its pores plugged with an inert heat resistant material to render it impervious to gases.

References Cited in the file of this patent

UNITED STATES PATENTS

| | | |
|---|---|---|
| 1,429,296 | Obert | Sept. 19, 1922 |
| 2,224,748 | Sauer | Dec. 10, 1940 |
| 2,276,830 | Doran | Mar. 17, 1942 |